United States Patent [19]

Panthöfer

[11] Patent Number: 4,483,368
[45] Date of Patent: Nov. 20, 1984

[54] PLUG CONNECTION FOR AQUARIUM PRESSURE MEDIUM CONDUITS

[75] Inventor: Rudolf Panthöfer, St. Augustin, Fed. Rep. of Germany

[73] Assignee: Tetra Werke Dr. rer. nat. Ulrich Baensch GmbH, Melle, Fed. Rep. of Germany

[21] Appl. No.: 518,462

[22] Filed: Jul. 27, 1983

Related U.S. Application Data

[63] Continuation of Ser. No. 252,445, Apr. 9, 1981, abandoned.

[30] Foreign Application Priority Data

Apr. 16, 1980 [DE] Fed. Rep. of Germany ....... 3014527

[51] Int. Cl.$^3$ ............................................. F16L 37/28
[52] U.S. Cl. .......................... 137/614.04; 137/614.01; 251/149.6; 251/149.7
[58] Field of Search ...................... 137/614.01, 614.03, 137/614.04; 251/149.6, 149.7

[56] References Cited

U.S. PATENT DOCUMENTS

| | | | |
|---|---|---|---|
| 2,548,528 | 4/1951 | Hansen | 251/149.6 |
| 2,823,048 | 2/1958 | Hansen | 137/614.04 |
| 3,538,950 | 11/1970 | Porteners | 251/149.6 |
| 3,851,666 | 12/1974 | Hammond | 251/149.6 |

Primary Examiner—A. Michael Chambers
Attorney, Agent, or Firm—Becker & Becker, Inc.

[57] ABSTRACT

A plug connection for aquarium pressure medium conduits, particularly in combination with external aquarium filter devices. The connection comprises a plug, and a sleeve for receiving the plug. Both the plug and the sleeve are provided with a valve disc capable of blocking an associated conduit. Each valve disc is liftable from a sealing seat thereof against the force or biasing effect of a spring associated therewith. During plugging together of the plug and sleeve, axially displaceable shafts of the valve discs come into abutment with each other. The housing of the plug and the housing of the sleeve are capable of being plugged together in such a manner that a pressure-tight conduit is formed between the two valve discs.

1 Claim, 1 Drawing Figure

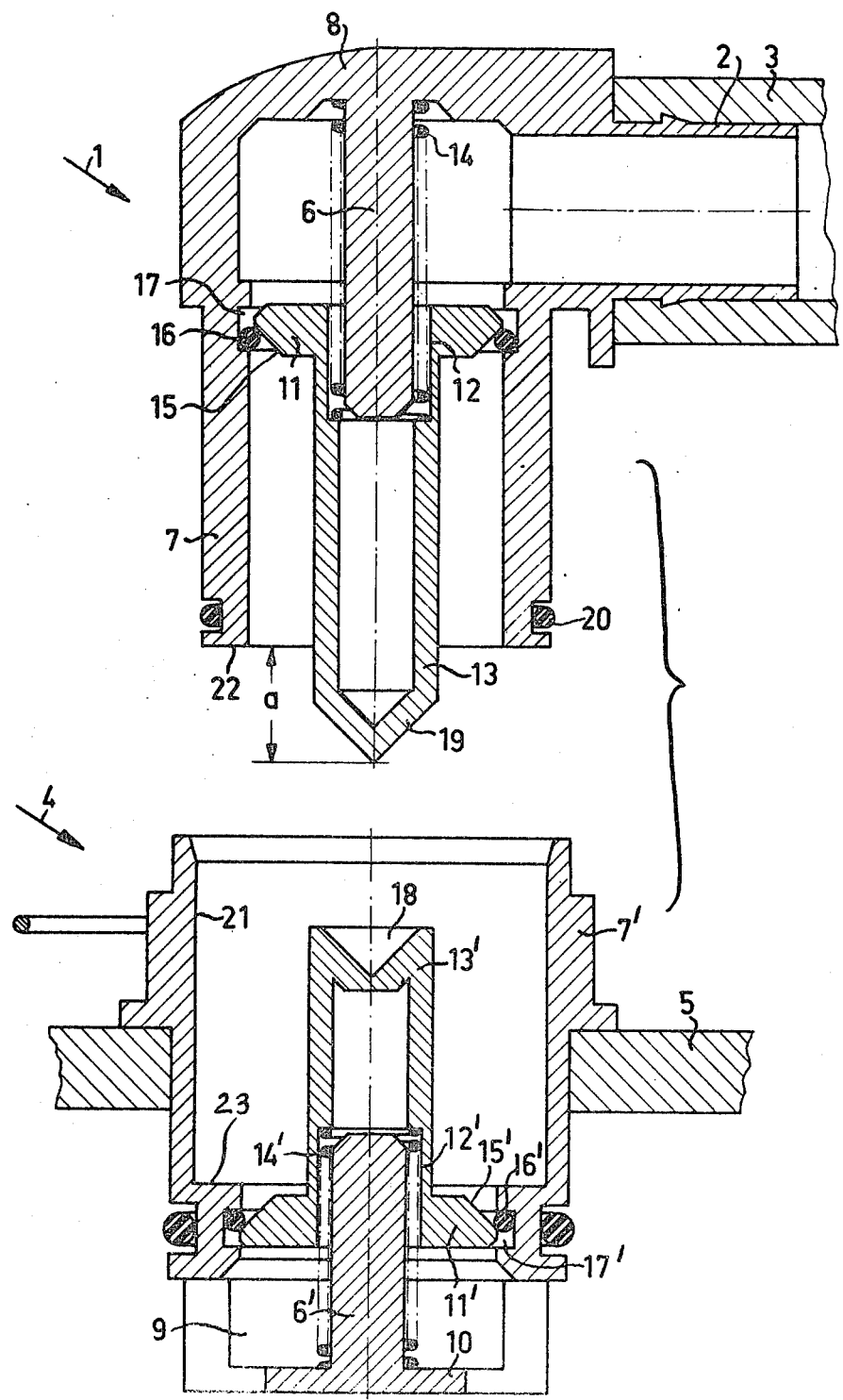

PLUG CONNECTION FOR AQUARIUM PRESSURE MEDIUM CONDUITS

This is a continuation application of Ser. No 252,445—Panthöfer, filed Apr. 9, 1981, now abandoned.

The present invention relates to a plug connection for aquarium pressure medium conduits, particularly in connection with aquarium filter devices, such as external filter connections, and comprises a plug, and a sleeve for receiving this plug.

Aquarium conduits generally are very critical because, if handled in an inexperienced or unprofessional manner, they can cause damage to the aquarium and/or its contents, and because the servicing of aquariums is primarily handled by inexperienced individuals or by children. Additionally, these conduits are particularly critical if they are used in connection with so-called external filters, in which case they are mostly under an overpressure.

It is an object of the present invention to embody the aforementioned connections in such a manner that they can be operated under pressure without having to fear that water will leak or flow out.

This object, and other objects and advantages of the present invention, will appear more clearly from the following specification in connection with the accompanying drawing, which is a vertical section through one embodiment of an inventive elbow-type plug and an associated sleeve, with the plug and sleeve being aligned one above the other.

The plug connection of the present invention is characterized primarily in that both the plug and the sleeve are provided with a valve disc or plate which blocks a conduit while being subjected to a spring pressure; the axially displaceable shafts of the valve discs, during coupling or plugging together, come into abutment with each other. Furthermore, the housing of the plug and of the sleeve can be plugged together in such a manner that, in assembled condition, they form a pressure-tight conduit between the two valve discs.

Accordingly, each of the two structural elements necessary for the formation of the plug connection, namely the plug and the sleeve, includes its own valve by means of which the pressure medium conduit can be blocked.

However, when the two structural elements are plugged together, both valves open, thus letting the fluid flow through, while the housing of the sleeve and of the plug again form a pressure-tight or liquid-tight connection.

Consequently, the conduits of an aquarium which are under pressure can be separated from each other and reunited while being under pressure.

To assure a good guidance of the valve discs, they have preferably shafts associated therewith which are arranged coaxially with respect to the discs. These shafts can be guided so that with a longitudinal movement of the shafts, there can occur a corresponding movement of the valve discs.

According to specific preferred embodiments of the present invention, the shafts are so dimensioned that when plugging together the sleeve and the plug, they abut upon each other prior to lifting off of the valve discs from their sealing seats. The two shafts in such case positively fit into each other with their free ends. One shaft may have an essentially conical recess or depression, and the other shaft may have a correspondingly shaped conical free end.

Each of the valve discs and their shafts may be provided with a central bore into which a pin mounted on the pertaining housing encages or projects in such a way that the valve discs and the shafts are longitudinally guided. The valve springs may surround the pins.

The valve discs may each have an inclined seating surface which engage sealing rings located in grooves of the housings.

The plug, in the assembled or plugged-together condition, may with its end face engage an abutment surface of the housing of the sleeve.

The front part of the housing surrounding the shaft of the plug may be provided with a seal in the region of its free edge, with this seal sealingly engaging the inner surface of a bore in the sleeve corresponding in shape to the free end of the plug housing.

The sleeve may be located in a hole or bore of a filter housing wall in partially countersunk arrangement, and the plug is preferably embodied as an elbow or angle plug.

Referring now to the drawing in detail, the upper portion shows an elbow type plug 1, the upper rear part of which is provided with a horizontally projecting spout 2 for receiving a hose or tube 3 which leads to a pressure pump located inside the aquarium.

The sleeve 4, illustrated in the lower portion of the drawing, is, on the other hand, inserted in a wall 5 of a pressure-tight filter housing.

The sleeve 4 and the plug 1 have respective upwardly and downwardly directed pins or studs 6, 6', which are arranged coaxially of the two housings 7,7', the fronts of which are essentially tubular in shape. The pin 6 of plug 1 is fastened to the upper transverse wall 8 of the housing 7, and the pin 6' of sleeve 4 is mounted in a cage 9 which is formed by arms 10 for passage of water therethrough.

Longitudinally guided on the pins 6,6' are the valve discs 11, 11', respectively associated with the plug 1 and the sleeve 4, with bores 12, 12', and the pertaining hollow shafts 13, 13'.

Compression springs 14, 14' located on the pins 6,6' act on the valve discs 11, 11' in such a manner that their inclined seating surfaces 15, 15' are pressed against respective sealing rings 16, 16' located in annular grooves 17, 17' of the housings 7,7'. The compression springs 14, 14' thus assure valve closure. The passage of water is therefore not possible when the sleeve 4 and the plug 1 are separated.

Shaft 13 of plug 1 has at its free end a conical tip 19; the free end of shaft 13' of sleeve 4 has a corresponding conical recess or depression 18 which matches the conical tip 19 of shaft 13. Additionally, the free end of shaft 13 of plug 1 projects out of the housing 7 by a distance a. The length of shaft 13' of sleeve 4 is so dimensioned that, upon plugging together of plug 1 and sleeve 4, the conical tip 19 of shaft 13 engages over its entire surface in the recess 18 of shaft 13' after the sealing ring or seal 20 of plug 1, which seal is located externally of the free end of the housing 7, has already come into engagement along the inner surface 21 of sleeve 4. Only after this sealing connection has been established, does there occur, during further plugging together of sleeve 4 and plug 1, a displacement of the shafts 13, 13' against the spring force. The thus resulting lifting of the valve discs 11, 11', and the opening of the valves, thus occurs only after the formation of a pressure-tight passage through the tubular shaped parts of the housing 7,7' facing each other. In plugged-in condition, the end face 22 of plug 1 then rests on the abutment surface 23 of sleeve 4.

The plug 1 is pulled out for releasing the connection, for instance for the purpose of cleaning the filter. The valves then close due to the spring force; this closing of the valves takes place before separation of plug 1 and sleeve 4 is completed.

The present invention is, of course, in no way restricted to the specific disclosure of the specification and drawing, but also encompasses any modifications within the scope of the appended claims.

What I claim is:

1. A plug connection for pressure medium conduits of aquariums particularly in connection with aquarium filter devices including external filter connections, comprising in combination:

a plug connectible to a conduit and including a first housing;

a sleeve, for receiving said plug, and also connectible to a conduit and including a further housing;

a respective valve disc located within each of said housings of said plug and of said sleeve respectively for blocking said conduits thereof, said valve discs each being respectively provided with sealing surfaces as valve seats, and with axially displaceable shafts, said shafts of said valve discs being so dimensioned that, when said housings of said plug and said sleeve respectively are plugged together, said shafts abut one another prior to the lifting of said sealing surfaces of said valve discs from the associated first and further housings; and respective valve springs in each of said first and further housings respectively for urging said sealing surfaces of the associated valve discs into sealing contact with the associated housing respectively, said sealing surfaces being lifted from the associated first and further housings respectively only after a time, when said housings of said plug and said sleeve are plugged together, so as to form a pressure-tight conduit between said valve discs for communication with said conduits of said plug and said sleeve, the closing of valve discs urged by said valve springs respectively taking place before separation of said plug and said sleeve is completed when said plug is pulled out for releasing the connection for instance for the purpose of cleaning the filter device, each of said housings being provided with an inner pin, and each of said valve discs and its shaft being provided with a central bore, said pins extending toward said valve discs and projecting into the associated central bore in such a way that the valve discs and shafts are longitudinally guided, said valve springs surrounding the associated pins further in which each of said housings respectively also is provided with an inner peripheral groove; which includes a respective sealing ring located in said inner grooves; and said sealing surfaces of said valve discs are inclined seating surfaces urged into sealing contact against an associated sealing ring, said plug housing being provided with an end face remote from its conduit, and said sleeve housing being provided with an abutment surface, said end face engaging said abutment surface when said housings of said plug and said sleeve are plugged together, that part of said housing of said plug surrounding the associated shaft and remote from its conduit being provided with a seal, and that part of said housing of said sleeve surrounding the associated shaft being provided with a bore corresponding in shape to said plug housing and being provided with an inner surface adapted to sealingly engage said seal when said housings of said plug and said sleeve respectively are plugged together, said plug being an elbow type plug, and the conduit of said sleeve being part of the wall of a filter housing and being provided with a bore for receiving said sleeve, those ends of said shafts adapted to abut one another also having a fit positively joined into one another, one of said shafts having an essentially conical recess, and said other shaft having a correspondingly shaped conical end complementary to the conical recess.

* * * * *